US012461464B2

(12) United States Patent
Kashihara et al.

(10) Patent No.: US 12,461,464 B2
(45) Date of Patent: Nov. 4, 2025

(54) CHARGING ROLL FOR ELECTROPHOTOGRAPHIC EQUIPMENT

(71) Applicant: Sumitomo Riko Company Limited, Aichi (JP)

(72) Inventors: Shinkichi Kashihara, Aichi (JP); Junichiro Suenaga, Aichi (JP); Akitoshi Morita, Aichi (JP); Takeru Horiuchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/939,477

(22) Filed: Nov. 6, 2024

(65) Prior Publication Data

US 2025/0060687 A1 Feb. 20, 2025

Related U.S. Application Data

(63) Continuation of application No. PCT/JP2023/017624, filed on May 10, 2023.

(30) Foreign Application Priority Data

Jun. 24, 2022 (JP) ................................ 2022-101690

(51) Int. Cl.
*G03G 15/02* (2006.01)

(52) U.S. Cl.
CPC ... *G03G 15/0233* (2013.01); *G03G 2215/025* (2013.01)

(58) Field of Classification Search
CPC ..................... G03G 15/0233; G03G 2215/025
See application file for complete search history.

(56) References Cited

U.S. PATENT DOCUMENTS 9,046,805 B1 6/2015 Tomari et al.
9,539,744 B2 1/2017 Tajima
(Continued)

FOREIGN PATENT DOCUMENTS

JP 2002132020 5/2002
JP 2006258932 9/2006
(Continued)

OTHER PUBLICATIONS

"International Search Report (Form PCT/ISA/210) of PCT/JP2023/017624", mailed on Jun. 13, 2023, with English translation thereof, pp. 1-6.

*Primary Examiner* — Joseph S Wong
(74) *Attorney, Agent, or Firm* — JCIPRNET

(57) ABSTRACT

Provided is a charging roll for electrophotographic equipment with which any increase in resistance and any bleeding of ionic electroconductive agent while energization persists can be minimized. A charging roll 10 for electrophotographic equipment, the charging roll 10 comprising a shaft body 12 and an elastic layer 14 that is formed on the outer peripheral surface of the shaft body 12, the elastic layer 14 being a crosslinked article of a rubber composition containing the following components (a) to (e). (a) One or more selected from hydrin rubber and nitrile rubber, (b) a crosslinking agent, (c) an ionic electroconductive agent, (d) one or more selected from piperidinyloxy radical compounds and phenolic antioxidants, and (e) one or more selected from salts of cyclic amidine compounds and thiophthalimide compounds.

6 Claims, 1 Drawing Sheet

(56) References Cited

U.S. PATENT DOCUMENTS

| | | | | |
|---|---|---|---|---|
| 10,018,935 | B2 | 7/2018 | Ishida et al. | |
| 11,753,519 | B2 | 9/2023 | Kashihara et al. | |
| 2006/0183615 | A1* | 8/2006 | Eun | G03G 15/0818<br>29/895.21 |
| 2021/0232058 | A1* | 7/2021 | Nakazato | G03G 15/0216 |
| 2022/0260937 | A1* | 8/2022 | Oura | G03G 15/0233 |

FOREIGN PATENT DOCUMENTS

| | | |
|---|---|---|
| JP | 2014065811 | 4/2014 |
| JP | 2015114589 | 6/2015 |
| JP | 2015184579 | 10/2015 |
| JP | 2015212728 | 11/2015 |
| JP | 2016085395 | 5/2016 |
| JP | 2019152778 | 9/2019 |
| JP | 2019211552 | 12/2019 |

* cited by examiner

CHARGING ROLL FOR ELECTROPHOTOGRAPHIC EQUIPMENT

CROSS-REFERENCE TO RELATED APPLICATION

The present application is a continuation of PCT/JP2023/017624, filed on May 10, 2023, and is related to and claims priority from Japanese Patent Application No. 2022-101690 filed on Jun. 24, 2022. The entire contents of the aforementioned application are hereby incorporated by reference herein.

TECHNICAL FIELD

The disclosure relates to a charging roll for electrophotographic equipment, which is suitably used in electrophotographic equipment such as copying machines, printers, and facsimiles that employ an electrophotographic system.

RELATED ART

An ionic electroconductive mechanism is sometimes required for a charging roll of electrophotographic equipment for electrical uniformity, etc. For example, Patent Document 1 (Japanese Patent Application Laid-Open No. 2002-132020) discloses that an ionic electroconductive agent is mixed into the base layer of a charging roll.

If an electrical load caused by energization continues to be applied to a charging roll, the electrical resistance of the charging roll increases, and there is a risk of image defects due to a decrease in charging ability. This is because, when an electrical load is applied to the charging roll, the ionic electroconductive agent in the base layer rubber of the charging roll is polarized, and as the polarization of the ionic electroconductive agent is too fast, the polarized anions and cations are excessively biased to the + electrode side and the − electrode side, respectively, resulting in less ionic electroconductive agent in the central portion of the base layer rubber and creating portions with high electrical resistance. If the amount of the ionic electroconductive agent is excessively increased to suppress excessive polarization in the base layer rubber, this may lead to bleeding of the ionic electroconductive agent and cause image defects.

The disclosure provides a charging roll for electrophotographic equipment, which suppresses an increase in resistance and bleeding of an ionic electroconductive agent while energization persists.

SUMMARY

A charging roll for electrophotographic equipment according to the disclosure includes: a shaft body and an elastic layer formed on an outer peripheral surface of the shaft body, in which the elastic layer is a crosslinked product of a rubber composition that contains the following (a) to (e):

(a) one or two or more selected from hydrin rubber and nitrile rubber,
(b) a crosslinking agent,
(c) an ionic electroconductive agent,
(d) one or two or more selected from piperidinyloxy radical compounds and phenolic antioxidants, and
(e) one or two or more selected from salts of cyclic amidine compounds and thiophthalimide compounds.

The (e) may be a naphthoic acid salt of a cyclic amidine compound. The (e) may be N-cyclohexylthiophthalimide.

The (c) may be an ammonium-based, phosphonium-based, or imidazolium-based ionic electroconductive agent. The (c) may be an ionic electroconductive agent that contains sulfonate anions having fluorine atoms, bis(sulfonyl)imide anions having fluorine atoms, or perchlorate anions. The rubber composition may further contain carbon black that has a specific surface area of 40 $m^2/g$ or more and 300 $m^2/g$ or less.

(1) A charging roll for electrophotographic equipment according to the disclosure includes a shaft body and an elastic layer formed on an outer peripheral surface of the shaft body, in which the elastic layer is a crosslinked product of a rubber composition that contains the following (a) to (e):

(a) one or two or more selected from hydrin rubber and nitrile rubber,
(b) a crosslinking agent,
(c) an ionic electroconductive agent,
(d) one or two or more selected from piperidinyloxy radical compounds and phenolic antioxidants, and
(e) one or two or more selected from salts of cyclic amidine compounds and thiophthalimide compounds.

(2) In the above (1), the (e) may be a naphthoic acid salt of a cyclic amidine compound.

(3) In the above (1), the (e) may be N-cyclohexylthiophthalimide.

(4) In any one of the above (1) to (3), the (c) may be an ammonium-based, phosphonium-based, or imidazolium-based ionic electroconductive agent.

(5) In any one of the above (1) to (4), the (c) may be an ionic electroconductive agent that contains sulfonate anions having fluorine atoms, bis(sulfonyl)imide anions having fluorine atoms, or perchlorate anions.

(6) In any one of the above (1) to (5), the rubber composition may further contain carbon black that has a specific surface area of 40 $m^2/g$ or more and 300 $m^2/g$ or less.

The charging roll for electrophotographic equipment according to the disclosure includes a shaft body and an elastic layer formed on an outer peripheral surface of the shaft body, and the elastic layer is a crosslinked product of the rubber composition containing the above-mentioned (a) to (e), so that an increase in resistance and bleeding of the ionic electroconductive agent are suppressed while energization persists.

When the (e) is a naphthoic acid salt of a cyclic amidine compound, the effect of suppressing an increase in resistance while energization persists is particularly excellent.

Further, when the (e) is N-cyclohexylthiophthalimide, the effect of suppressing an increase in resistance while energization persists is particularly excellent.

Then, when the (c) is an ammonium-based, phosphonium-based, or imidazolium-based ionic electroconductive agent, the polar groups of the rubber component of (a) are easily coordinated to the cations of the ionic electroconductive agent, and excessive polarization of the ionic electroconductive agent is easily suppressed while energization persists, which is particularly effective in suppressing an increase in resistance while energization persists. In addition, the salt of the cyclic amidine compound or the thiophthalimide compound of (e) is easily coordinated to the cations of the ionic electroconductive agent, and excessive polarization of the ionic electroconductive agent is easily suppressed while energization persists, which is particularly effective in suppressing an increase in resistance while energization persists. Furthermore, it is easy to achieve low resistance.

Then, since the ionic electroconductive agent containing sulfonate anions having fluorine atoms or bis(sulfonyl)imide anions having fluorine atoms contains a large number of fluorine groups in the structure, the basicity of the anions is small and forms a relatively weak ionic bond with the cations. Therefore, these ionic electroconductive agents are easily dissociated into ions in the rubber of (a), and tend to have low resistance. In addition, all of these anions are hydrophobic and have low hygroscopicity even in a high humidity environment, which is effective in suppressing fluctuation in electrical resistance due to environmental changes. Further, an ionic electroconductive agent containing perchlorate anions tends to have low resistance.

Then, when the rubber composition further contains carbon black that has a specific surface area of 40 $m^2/g$ or more and 300 $m^2/g$ or less, the effect of suppressing bleeding of the ionic electroconductive agent is improved.

DESCRIPTION OF EMBODIMENTS

Figure 1A:
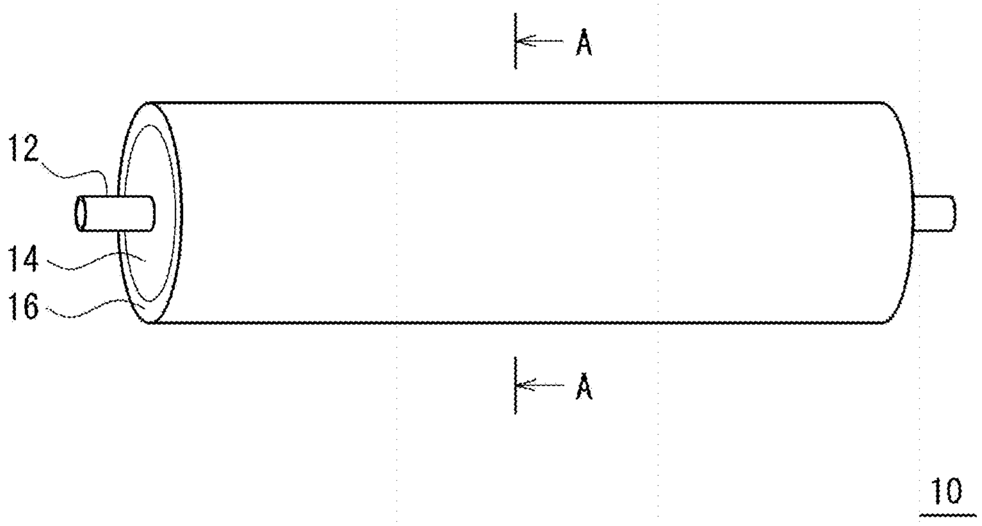
FIG. 1A is a schematic external view of the charging roll for electrophotographic equipment according to an embodiment of the disclosure.
Figure 1B:
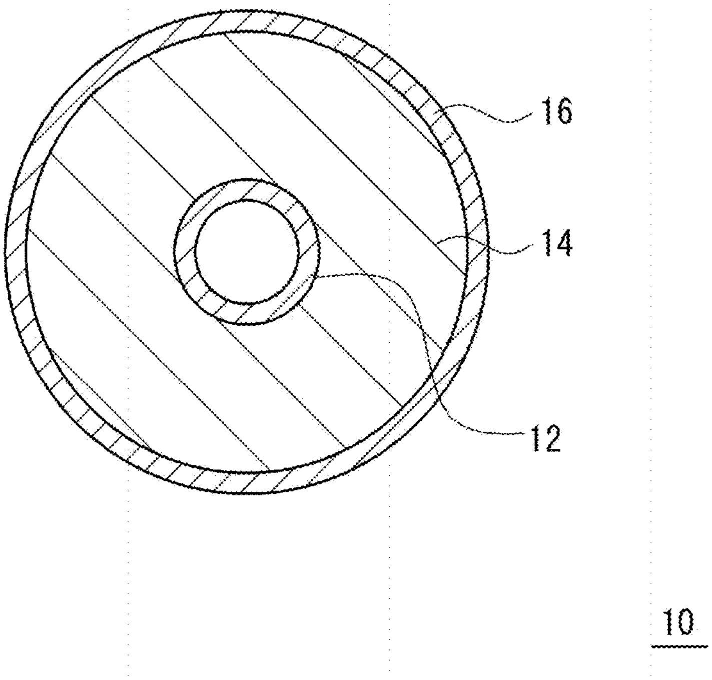
FIG. 1B is a cross-sectional view taken along line A-A.

A charging roll for electrophotographic equipment (hereinafter, may simply referred to as charging roll) according to the disclosure will be described in detail. FIG. 1A is a schematic external view of the charging roll for electrophotographic equipment according to an embodiment of the disclosure, and FIG. 1B is a cross-sectional view taken along line A-A.

The charging roll 10 includes a shaft body 12, an elastic layer 14 formed on the outer peripheral surface of the shaft body 12, and a surface layer 16 formed on the outer peripheral surface of the elastic layer 14. The elastic layer 14 is a layer (base layer) that serves as the base of the charging roll 10. The surface layer 16 is a layer that appears on the surface of the charging roll 10. The charging roll of the disclosure may have a configuration with no surface layer. That is, the charging roll may include the shaft body 12 and the elastic layer 14 formed on the outer peripheral surface of the shaft body 12, and may not have the surface layer 16 on the outer peripheral surface of the elastic layer 14.

The shaft body 12 is not particularly limited as long as the shaft body 12 is electroconductive. Specifically, examples of the shaft body 12 may include a core bar composed of a solid or hollow body made of metal such as iron, stainless steel, or aluminum. The surface of the shaft body 12 may be coated with an adhesive, a primer, or the like if necessary. In other words, the elastic layer 14 may be adhered to the shaft body 12 via an adhesive layer (primer layer). The adhesive, the primer, or the like may be made electroconductive if necessary.

The elastic layer 14 is composed of a crosslinked product of a rubber composition containing the following (a) to (e):

(a) one or two or more selected from hydrin rubber and nitrile rubber, (b) a crosslinking agent, (c) an ionic electroconductive agent, (d) one or two or more selected from piperidinyloxy radical compounds and phenolic antioxidants, and (e) one or two or more selected from salts of cyclic amidine compounds and thiophthalimide compounds.

Examples of the hydrin rubber include epichlorohydrin homopolymer (CO), epichlorohydrin-ethylene oxide binary copolymer (ECO), epichlorohydrin-allyl glycidyl ether binary copolymer (GCO), and epichlorohydrin-ethylene oxide-allyl glycidyl ether terpolymer (GECO). Among these, ECO and GECO which contain ethylene oxide as a copolymerization component are more preferable in that a low resistance body can be obtained more easily than polymers which do not contain ethylene oxide as a copolymerization component. Furthermore, GCO and GECO which contain allyl glycidyl ether as a copolymerization component are more preferable in that GCO and GECO are less likely to fatigue than polymers which do not contain allyl glycidyl ether as a copolymerization component because GCO and GECO have double bonds.

The nitrile rubber is acrylonitrile-butadiene rubber (NBR). Nitrile rubber is softer than hydrin rubber, which allows the ionic electroconductive agent to move more easily within the rubber. Even in this case, the configuration of the disclosure suppresses an increase in resistance and bleeding of the ionic electroconductive agent while energization persists. Furthermore, containing nitrile rubber as (a) makes it easy to adjust the hardness of the elastic layer 14.

The crosslinking agent is not particularly limited. Examples of the crosslinking agent may include a sulfur crosslinking agent, a peroxide crosslinking agent, and a dechlorination crosslinking agent. These crosslinking agents may be used alone or in combination of two or more.

Examples of the sulfur crosslinking agent may include powdered sulfur, precipitated sulfur, colloidal sulfur, surface-treated sulfur, insoluble sulfur, sulfur chloride, a thiuram-based vulcanization accelerator, and polymeric polysulfide.

Examples of the peroxide crosslinking agent include peroxyketal, dialkyl peroxide, peroxy ester, ketone peroxide, peroxydicarbonate, diacyl peroxide, and hydroperoxide.

From the viewpoints of having a relatively high decomposition temperature and easy moldability at a higher temperature, the peroxide crosslinking agent preferably has a decomposition temperature of 60° C. or higher and a one-minute half-life temperature of 150° C. or higher in a thermal storage test (BAM type: SADT). The one-minute half-life temperature is more preferably 160° C. or higher, and even more preferably 170° C. or higher. On the other hand, from the viewpoint of achieving an excellent crosslinking rate, the one-minute half-life temperature is preferably 200° C. or lower. The one-minute half-life temperature is more preferably 190° C. or lower, and even more preferably 180° C. or lower.

Preferable examples of the peroxide crosslinking agent include peroxyketal, dialkyl peroxide, and peroxyester. Examples of the peroxyketal include 1,1-di(tert-hexylperoxy)cyclohexane, 1,1-di(tert-butylperoxy)cyclohexane, and n-butyl 4,4-di(tert-butylperoxy)valerate. Examples of the dialkyl peroxide include di(2-tert-butylperoxyisopropyl) benzene, dicumyl peroxide, 2,5-dimethyl-2,5-di(tert-butylperoxy)hexane, and 2,5-dimethyl-2,5-di(tert-butylperoxy) hexyne-3. Examples of the peroxyester include tert-butyl peroxybenzoate, tert-hexyl peroxybenzoate, 2,5-dimethyl-2,5-di(benzoylperoxy)hexane, tert-butylperoxy-2-ethylhexyl monocarbonate, tert-butyl peroxy laurate, tert-butylperoxy-3,5,5-trimethylhexanoate, and tert-hexylperoxyisopropyl monocarbonate. Among these, di(2-tert-butylperoxyisopropyl)benzene, dicumyl peroxide, 2,5-dimethyl-2,5-di(tert-butylperoxy)hexane, and 1,1-di(tert-butylperoxy)cyclohexane are preferable from the viewpoints that unreacted components are less likely to remain and the decomposition product has a relatively low boiling point and is easy to remove.

Examples of the dechlorination crosslinking agent may include a dithiocarbonate compound. More specifically, examples may include quinoxaline-2,3-dithiocarbonate, 6-methylquinoxaline-2,3-dithiocarbonate, 6-isopropylquinoxaline-2,3-dithiocarbonate, and 5,8-dimethylquinoxaline-2,3-dithiocarbonate.

The mixing amount of the crosslinking agent is preferably within a range of 0.1 to 2 parts by mass, more preferably within a range of 0.3 to 1.8 parts by mass, and even more preferably within a range of 0.5 to 1.5 parts by mass, relative to 100 parts by mass of the specific polar rubber (a), from the viewpoint of preventing bleeding.

From the viewpoint of easily imparting a low hardness to the elastic layer 14, the content of the peroxide crosslinking agent is preferably 6 parts by mass or less relative to 100 parts by mass of the component (a), calculated as the amount of the peroxide ingredient. The content is more preferably 5 parts by mass or less, and even more preferably 4 parts by mass or less. From the viewpoints of achieving an excellent degree of crosslinking of the rubber and being less likely to fatigue, the content is preferably 0.2 parts by mass or more relative to 100 parts by mass of the component (a), calculated as the amount of the peroxide ingredient. The content is more preferably 0.4 parts by mass or more, and even more preferably 0.6 parts by mass or more.

The ionic electroconductive agent is not particularly limited. Any ionic electroconductive agent for use in the field of electrophotographic equipment may be used. Examples of the ionic electroconductive agent may include quaternary ammonium salt, quaternary phosphonium salt, imidazolium salt, borate, and a surfactant. Among these, quaternary ammonium salt, quaternary phosphonium salt, and imidazolium salt are particularly preferable.

Examples of the cations of the quaternary ammonium salt may include cations that have one or two or more alkyl groups or aryl groups having about 1 to 18 carbon atoms (such as methyl groups, ethyl groups, propyl groups, butyl groups, hexyl groups, octyl groups, decyl groups, phenyl groups, and xylyl groups). The alkyl group or aryl group of the cations of the quaternary ammonium salt particularly preferably has 1 to 10 carbon atoms. Examples of the anion of the quaternary ammonium salt may include halogen ions such as $F^-$, $Cl^-$, $Br^-$, and $I^-$, $ClO_4^-$, $BF_4^-$, $PF_6^-$, $SO_4^{2-}$, $HSO_4^-$, $C_2H_5SO_4^-$, $CF_3COO^-$, $CF_3SO_3^-$, $(CF_3SO_2)_2N^-$, $(CF_3CF_2SO_2)_2N^-$, $CF_3(CF_2)_3SO_3^-$, $(CF_3SO_2)_3C^-$, and $CF_3(CF_2)_2COO^-$. The anion of the quaternary ammonium salt is more preferably $ClO_4^-$, $(CF_3SO_2)_2N^-$, and $CF_3SO_3^-$, or the like.

Examples of the cations of the quaternary phosphonium salt may include cations that have one or two or more alkyl groups or aryl groups having about 1 to 18 carbon atoms (such as methyl groups, ethyl groups, propyl groups, butyl groups, hexyl groups, octyl groups, decyl groups, phenyl groups, and xylyl groups). The alkyl group or aryl group of the cations of the quaternary phosphonium salt particularly preferably has 1 to 10 carbon atoms. Examples of the anion of the quaternary phosphonium salt may include halogen ions such as $F^-$, $Cl^-$, $Br^-$, $PF_6^-$, $SO_4^{2-}$, $HSO_4^-$, $C_2H_5SO_4^-$, $CF_3COO^-$, $CF_3SO_3^-$, $(CF_3SO_2)_2N^-$, $(CF_3CF_2SO_2)_2N^-$, $CF_3(CF_2)_3SO_3^-$, $(CF_3SO_2)_3C^-$, and $CF_3(CF_2)_2COO^-$. The anion of the quaternary phosphonium salt is more preferably $ClO_4^-$, $(CF_3SO_2)_2N^-$, and $CF_3SO_3^-$, or the like.

Examples of the imidazolium salt may include unsubstituted imidazolium salt, 1-alkylimidazolium salt, 3-alkylimidazolium salt, 1,3-dialkylimidazolium salt, and 1,2,3-trialkylimidazolium salt. More specifically, examples may include 1-methylimidazolium salt, 1,3-dimethylimidazolium salt, 1,3-diethylimidazolium salt, 1,3-dipropylimidazolium salt, 1,3-dibutylimidazolium salt, 1,3-dicyclohexylimidazolium salt, 1-ethyl-3-methylimidazolium salt, 1-propyl-3-methylimidazolium salt, 1-butyl-3-methylimidazolium salt, 1-hexyl-3-methylimidazolium salt, 1-ethyl-2,3-dimethylimidazolium salt, 1-propyl-2,3-dimethylimidazolium salt, and 1-butyl-2,3-dimethylimidazolium salt. Examples of the anion of the imidazolium salt may include halogen ions such as $F^-$, $Cl^-$, $Br^-$, and $I^-$, $ClO_4^-$, $BF_4^-$, $PF_6^-$, $SO_4^{2-}$, $HSO_4^-$, $C_2H_5SO_4^-$, $CF_3COO^-$, $CF_3SO_3^-$, $(CF_3SO_2)_2N^-$, $(CF_3CF_2SO_2)_2N^-$, $CF_3(CF_2)_3SO_3^-$, $(CF_3SO_2)_3C^-$, and $CF_3(CF_2)_2COO^-$. The anion of the imidazolium salt is more preferably $ClO_4^-$, $(CF_3SO_2)_2N^-$, and $CF_3SO_3^-$, or the like.

Examples of the borate may include a borate that has one or two or more alkyl groups or aryl groups having about 1 to 18 carbon atoms (such as methyl groups, ethyl groups, propyl groups, butyl groups, hexyl groups, octyl groups, decyl groups, phenyl groups, and xylyl groups), and contains alkali metal ions or alkaline earth metal ions such as lithium ions, sodium ions, potassium ions, and calcium ions.

From the viewpoint of low resistance, the content of the ionic electroconductive agent is preferably 0.1 parts by mass or more relative to 100 parts by mass of the component (a). The content is more preferably 0.3 parts by mass or more, and even more preferably 0.5 parts by mass or more. Further, from the viewpoint of easily suppressing bleeding of the ionic electroconductive agent, the content is preferably 5.0 parts by mass or less relative to 100 parts by mass of the component (a). The content is more preferably 3.0 parts by mass or less, and even more preferably 2.0 parts by mass or less.

The piperidinyloxy radical compound functions as a retarder in the crosslinking. The piperidinyloxy radical compound maintains an equilibrium state with the radicals generated by thermal decomposition of the crosslinking agent. In the initial stage of crosslinking where the number of radicals generated is relatively small, an equilibrium state is maintained with the generated radicals, and the crosslinking reaction is suppressed (the crosslinking start time (T10) is delayed). On the other hand, the crosslinking rate can be increased by increasing the crosslinking temperature. This allows only the crosslinking start time (T10) to be delayed, without slowing down the overall crosslinking rate (T90). By adjusting the crosslinking rate in this manner, the molecular arrangement of the polymer is controlled. Since gaps are generated within the polymer for the ions of the ionic electroconductive agent to enter appropriately, the polar groups of the polymer can be appropriately coordinated to the ions of the ionic electroconductive agent. Thus, excessive polarization of the ionic electroconductive agent is suppressed even under an electrical load applied due to energization. In addition, as T10 is delayed, the salt of the cyclic amidine compound or the like can be uniformly diffused into the rubber by thermal diffusion before the curing of the rubber progresses. Since the ionic electroconductive agent is uniformly dispersed in the rubber, excessive polarization of the ionic electroconductive agent is suppressed even under an electrical load applied due to energization. T10 is the time (s) at which the maximum torque at the molding temperature (crosslinking temperature) reaches 10%, and T90 is the time (s) at which the maximum torque at the molding temperature (crosslinking temperature) reaches 90%.

The piperidinyloxy radical compound is a compound represented by the following general formula (1).

[Chemical formula 1]

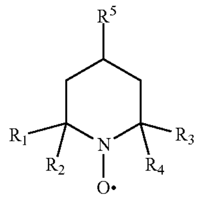

(1)

Examples of $R_1$ to $R_4$ include hydrogen and an alkyl group having 1 to 4 carbon atoms. Examples of $R_5$ include hydrogen, an alkyl group having 1 to 4 carbon atoms, an aryl group, an acetoxy group, a benzyloxy group, a carboxylic acid group, an acetamide group, and an aldehyde group.

Preferable examples of the piperidinyloxy radical compound include 2,2,6,6-tetramethylpiperidinyloxy radical, 4-hydroxy-2,2,6,6-tetramethylpiperidinyloxy radical, 4-benzoyloxy-2,2,6,6-tetramethylpiperidinyloxy radical, and 4-acetamido-2,2,6,6-tetramethylpiperidinyloxy radical. Among these, from the viewpoints of the melting point being within the optimum range relative to the molding temperature of the rubber, radical scavenging ability, storage stability, and cost, 4-hydroxy-2,2,6,6-tetramethylpiperidinyloxy radical, 4-benzoyloxy-2,2,6,6-tetramethylpiperidinyloxy radical, and 4-acetamido-2,2,6,6-tetramethylpiperidinyloxy radical are more preferable.

The phenolic antioxidant exerts the same function and effect as the piperidinyloxy radical compound in the reaction system of the disclosure. That is, only the crosslinking start time (T10) is delayed, without slowing down the overall crosslinking rate (T90). A hindered phenolic antioxidant can be used as the phenolic antioxidant. Additionally, monophenolic, diphenolic, triphenolic, and polyphenolic antioxidants can be used.

Examples of the hindered phenolic antioxidant may include 2-[1-(2-hydroxy-3,5-di-tert-pentylphenyl)ethyl]-4,6-di-tert-pentylphenyl acrylate, pentaerythritol tetrakis[3-(3,5-di-tert-butyl-4-hydroxyphenyl)propionate], N,N'-hexane-1,6-diylbis[3-(3,5-di-tert-butyl-4-hydroxyphenylpropionamide], 1,3,5-tris(3,5-di-tert-butyl-4-hydroxybenzyl)-1,3,5-triazine-2,4,6(1H,3H,5H)-trione, 2,6-di-tert-butyl-4-methylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), and 4,4',4"-[(2,4,6-tri)methylbenzene-1,3,5-triyl]tris(methylene)]tris(2,6-di-tert-butylphenol).

From the viewpoint of suitability for adjusting the crosslinking rate, the content of (d) is preferably 0.05 parts by mass or more relative to 100 parts by mass of the component (a). The content is more preferably 0.1 parts by mass or more, and even more preferably 0.2 parts by mass or more. Furthermore, the content is preferably 3.0 parts by mass or less relative to 100 parts by mass of the component (a). The content is more preferably 2.0 parts by mass or less, and even more preferably 1.0 part by mass or less.

The cyclic amidine compound is a cyclic compound that contains an amidine structure in the structure. The salt of the cyclic amidine compound has an appropriate polarity to be coordinated to the ions (cations) of the ionic electroconductive agent. By coordinating the salt of the cyclic amidine compound to the ions of the ionic electroconductive agent, excessive polarization of the ionic electroconductive agent is suppressed even under an electrical load applied due to energization. The cyclic amidine compound effectively exhibits the above-mentioned effect in the form of salt.

The cyclic amidine compound is preferably a bicyclic amidine compound from the viewpoint of availability. Examples of the cyclic amidine compound include diazabicycloundecene (1,8-diazabicyclo(5.4.0)undecene-7) and diazabicyclononene (1,5-diazabicyclo(4.3.0)nonene-5). As the cyclic amidine compound, diazabicycloundecene is more preferable from the viewpoints of cation coordination ability and storage stability.

Examples of the salt of the cyclic amidine compound include naphthoic acid salt of the cyclic amidine compound, and phenolic resin salt, aliphatic carboxylate salt, phenol salt, and borate salt of the cyclic amidine compound. As the salt of the cyclic amidine compound, naphthoic acid salt of the cyclic amidine compound is more preferable because the increase in resistance due to polarization of the ionic electroconductive agent while energization persists is small.

The thiophthalimide compound is a compound that contains a thiophthalimide structure in the structure. The thiophthalimide compound exerts the same function and effect as the salt of the cyclic amidine compound in the reaction system of the disclosure. That is, the thiophthalimide compound has an appropriate polarity to be coordinated to the ions of the ionic electroconductive agent, and by coordinating to the ions of the ionic electroconductive agent, excessive polarization of the ionic electroconductive agent is suppressed even under an electrical load applied due to energization. Examples of the thiophthalimide compound include N-cyclohexylthiophthalimide, N-trifluoromethylthiophthalimide, N-phenylthiophthalimide, and N,N'-thiodiphthalimide.

The content of (e) is preferably 0.1 parts by mass or more relative to 100 parts by mass of the component (a) from the viewpoint of achieving an excellent effect of suppressing excessive polarization of the ionic electroconductive agent even under an electrical load applied due to energization. The content is more preferably 0.5 parts by mass or more, and even more preferably 1.0 part by mass or more. Further, from the viewpoint of suppressing bleeding of (e), the content is preferably 5.0 parts by mass or less relative to 100 parts by mass of the component (a). The content is more preferably 4.0 parts by mass or less, and even more preferably 3.0 parts by mass or less.

The rubber composition may contain other additives if necessary. Examples of other additives include an electronic conductive agent, a lubricant, an anti-aging agent, a light stabilizer, a viscosity modifier, a processing aid, a flame retardant, a plasticizer, a filler, a dispersant, a pigment, and a mold release agent.

Examples of the electronic conductive agent include carbon black, graphite, electroconductive titanium oxide, electroconductive zinc oxide, and electroconductive tin oxide.

The rubber composition may further contain carbon black. Carbon black can adsorb the cations of the ionic electroconductive agent, thereby suppressing the bleeding of the ionic electroconductive agent. Carbon black having a specific surface area within a specific range can be preferably used. As the specific surface area of carbon black increases, it becomes easier to adsorb the cations of the ionic electroconductive agent. On the other hand, as the specific surface area increases, carbon black is more likely to aggregate and the electrical conductivity is more likely to decrease. Therefore, considering the balance between the effect of suppressing the bleeding of the ionic electroconductive agent and the effect of suppressing the decrease in electrical conductivity, the specific surface area of carbon black is preferably 40 $m^2/g$ or more and 300 $m^2/g$ or less, and more preferably 42 $m^2/g$ or more and 240 $m^2/g$ or less. The specific surface area of carbon black can be measured by a nitrogen adsorption method.

Taking into consideration the hardness and electrical conductivity of the elastic layer 14, the content of carbon black is preferably 5 parts by mass or more and 40 parts by mass or less relative to 100 parts by mass of the component (a). The content is more preferably 10 parts by mass or more and 30 parts by mass or less.

The thickness of the elastic layer 14 is not particularly limited, but is preferably within a range of 0.1 mm to 10 mm, more preferably within a range of 0.5 mm to 5 mm, and even more preferably within a range of 1 mm to 3 mm.

The volume resistivity of the elastic layer 14 is not particularly limited, but is preferably within a range of $10^2$ Ω·cm to $10^{10}$ Ω·cm, more preferably $10^3$ Ω·cm to $10^9$ Ω·cm, and even more preferably $10^4$ Ω·cm to $10^8$ Ω·cm.

The surface layer 16 can function as a protective layer for the roll surface. The surface layer 16 preferably contains, as a main material, a polymer component such as polyamide, polyurethane, acrylic resin, alkyd resin, phenol resin, fluororesin, silicone resin, and modified products thereof. Examples of the modifying group in the modified products may include an N-methoxymethyl group, a silicone group, and a fluorine group. These polymer components may be contained alone or in combination of two or more as the surface layer material. The polymer component of the surface layer 16 may be crosslinked.

In order to impart electrical conductivity to the surface layer 16, an electroconductive agent such as carbon black, graphite, electroconductive titanium oxide, electroconductive zinc oxide, electroconductive tin oxide, and an ionic electroconductive agent (such as quaternary ammonium salt, borate, and a surfactant) can be added appropriately. If necessary, various additives may be added appropriately. Furthermore, in order to ensure surface roughness, roughness-forming particles may be added.

The roughness-forming particles form surface roughness on the surface layer 16. Examples of the roughness-forming particles include resin particles and silica particles. Examples of the resin particles include urethane particles, silicone particles, and acrylic particles. The average particle size of the roughness-forming particles is preferably within a range of 3 μm to 50 μm. The average particle size of the roughness-forming particles can be calculated from the median size using a laser diffraction particle size distribution measuring device.

The thickness of the surface layer 16 is not particularly limited, but is preferably within a range of 0.01 μm to 100 μm, more preferably within a range of 0.1 μm to 20 μm, and even more preferably within a range of 0.3 μm to 10 μm. The volume resistivity of the surface layer 16 is preferably within a range of $10^7$ Ω·cm to $10^{12}$ Ω·cm, more preferably $10^8$ Ω·cm to $10^{11}$ Ω·cm, and even more preferably $10^9$ Ω·cm to $10^{10}$ Ω·cm.

The charging roll 10 can be manufactured, for example, as follows. First, the shaft body 12 is placed coaxially in the hollow portion of a roll molding die, and the rubber composition is injected therein and heated and cured, and then the roll molding die is removed, or the rubber composition is extruded onto the surface of the shaft body 12, so as to form the elastic layer 14 on the outer periphery of the shaft body 12. Next, a surface layer forming composition is applied to the outer periphery of the formed elastic layer 14, and then ultraviolet irradiation or heat treatment is performed if necessary, thereby forming the surface layer 16. In this way, the charging roll 10 can be manufactured.

The surface layer forming composition contains the above-mentioned main material, an electroconductive agent, and other additives which are added as required. Examples of other additives may include a crosslinking agent for the polymer components, a leveling agent, and a surface modifier. From the viewpoint of adjusting the viscosity, the surface layer forming composition may appropriately contain a solvent which may be, for example, an organic solvent such as methyl ethyl ketone, toluene, acetone, ethyl acetate, butyl acetate, methyl isobutyl ketone (MIBK), THF, and DMF, or a water-soluble solvent such as methanol and ethanol. As the application method, various coating methods such as roll coating, dipping, and spray coating can be used.

According to the charging roll 10 having the above-described configuration, the elastic layer 14 is made of a crosslinked product of the rubber composition containing the above-mentioned (a) to (e), so that an increase in resistance and bleeding of the ionic electroconductive agent are suppressed while energization persists. The reason is believed to be the following mechanism. That is, by coordinating the salt of the cyclic amidine compound or the thiophthalimide compound to the ions of the ionic electroconductive agent, excessive polarization of the ionic electroconductive agent is suppressed even under an electrical load applied due to energization. Further, when the piperidinyloxy radical compound or the phenolic antioxidant crosslinks the hydrin rubber or nitrile rubber, only the crosslinking start time (T10) is delayed, without slowing down the overall crosslinking rate (T90). By adjusting the crosslinking rate in this manner, the molecular arrangement of the polymer is controlled. Since gaps are generated within the polymer for the ions of the ionic electroconductive agent to enter appropriately, the polar groups of the polymer can be appropriately coordinated to the ions of the ionic electroconductive agent. Thus, excessive polarization of the ionic electroconductive agent is suppressed even under an electrical load applied due to energization. In addition, as T10 is delayed, the salt of the cyclic amidine compound or the like can be uniformly diffused into the rubber by thermal diffusion before the curing of the rubber progresses. Since the ionic electroconductive agent is uniformly dispersed in the rubber, excessive polarization of the ionic electroconductive agent is suppressed even under an electrical load applied due to energization. Based on the above, an increase in resistance is suppressed while energization persists. Moreover, since excessive polarization of the ionic electroconductive agent is not suppressed by an increase in the amount of the ionic electroconductive agent, bleeding of the ionic electroconductive agent is also suppressed. In addition, by coordinating the salt of the cyclic amidine compound or the thiophthalimide compound to the ions of the ionic electroconductive agent, and delaying only the crosslinking start time (T10) without slowing down the overall crosslinking rate (T90), gaps are generated within the polymer for the ions of the ionic electroconductive agent to enter appropriately, and the polar groups of the polymer are appropriately coordinated to the ions of the ionic electroconductive agent, making it more difficult for the ionic electroconductive agent to bleed. Therefore, bleeding of the ionic electroconductive agent is suppressed even if the amount of the ionic electroconductive agent is increased.

Then, when the ionic electroconductive agent is an ammonium-based, phosphonium-based, or imidazolium-based agent, the polar groups of the rubber component of (a) are easily coordinated to the cations of the ionic electroconductive agent, and excessive polarization of the ionic electroconductive agent is easily suppressed while energization persists, which is particularly effective in suppressing an increase in resistance while energization persists. In addition, the salt of the cyclic amidine compound or the thiophthalimide compound of (e) is easily coordinated to the cations of the ionic electroconductive agent, and excessive polarization of the ionic electroconductive agent is easily suppressed while energization persists, which is particularly effective in suppressing an increase in resistance while energization persists. Furthermore, it is easy to achieve low resistance.

Then, when the ionic electroconductive agent is an ionic electroconductive agent that contains sulfonate anions having fluorine atoms or bis(sulfonyl)imide anions having fluorine atoms, the basicity of the anions is small due to the large number of fluorine groups contained in the structure, and forms a relatively weak ionic bond with the cations. Therefore, these ionic electroconductive agents are easily dissociated into ions in the rubber of (a), and tend to have low resistance. In addition, all of these anions are hydrophobic and have low hygroscopicity even in a high humidity environment, which is effective in suppressing fluctuation in electrical resistance due to environmental changes. Further, an ionic electroconductive agent containing perchlorate anions tends to have low resistance.

EXAMPLE

The disclosure will be described in detail below using examples and comparative examples.

Experimental Example 1

<Preparation of Rubber Composition>

A rubber composition was prepared by mixing and stirring 100 parts by mass of hydrin rubber (ECO), 3 parts by mass of a peroxide crosslinking agent (Peroximon F40) (1.2 parts by weight, calculated as the amount of the ingredient), 0.2 parts by mass of a piperidinyloxy radical compound (4-hydroxy TEMPO radical), 5 parts by mass of an acid acceptor, 1 part by mass of an ionic electroconductive agent, and 0.1 parts by mass of a salt of a cyclic amidine compound (naphthoic acid salt of diazabicycloundecene) with a stirrer.

<Formation of Elastic Layer>

A core bar (diameter 6 mm) was set in a molding die, and the above rubber composition was injected at 120° C. and heated at 175° C. for 30 minutes to crosslink the rubber composition. Thereafter, the product was cooled and removed from the molding die to form an elastic layer having a thickness of 2 mm on the outer periphery of the core bar.

<Formation of Surface Layer>

A surface layer forming composition was prepared by mixing 100 parts by mass of N-methoxymethylated nylon ("EF30T" produced by Nagase ChemteX), 60 parts by mass of electroconductive tin oxide ("S-2000" produced by Mitsubishi Materials), 1 part by mass of citric acid, and 300 parts by mass of methanol. Next, the surface of the elastic layer was roll-coated with the surface layer forming composition and heated at 120° C. for 50 minutes to form a surface layer having a thickness of 10 m on the outer periphery of the elastic layer. In this way, the charging roll according to Example 1 was produced.

Experimental Example 2

A charging roll was produced in the same manner as in Experimental Example 1, except that in the preparation of the rubber composition, the mixing amount of the salt of the cyclic amidine compound was changed.

Experimental Examples 3 to 4

A charging roll was produced in the same manner as in Experimental Example 1, except that in the preparation of the rubber composition, the mixing amounts of the salt of the cyclic amidine compound and the piperidinyloxy radical compound were changed.

Experimental Examples 5 to 6

A charging roll was produced in the same manner as in Experimental Example 1, except that in the preparation of the rubber composition, the type and mixing amount of the salt of the cyclic amidine compound were changed.

Experimental Example 7

A charging roll was produced in the same manner as in Experimental Example 1, except that in the preparation of the rubber composition, a thiophthalimide compound was used in place of the salt of the cyclic amidine compound and the mixing amount was changed.

Experimental Example 8

A charging roll was produced in the same manner as in Experimental Example 1, except that in the preparation of the rubber composition, nitrile rubber (NBR) was used in place of hydrin rubber (ECO) and the mixing amount of the cyclic amidine compound was changed.

Experimental Example 9

A charging roll was produced in the same manner as in Experimental Example 1, except that in the preparation of the rubber composition, a phenolic antioxidant was used in place of the piperidinyloxy radical compound, the mixing amount thereof was changed, and the mixing amount of the cyclic amidine compound was also changed.

Experimental Example 10

A charging roll was produced in the same manner as in Experimental Example 1, except that in the preparation of the rubber composition, the mixing amount of the salt of the cyclic amidine compound was changed and the mixing amount of the ionic electroconductive agent was also changed.

Experimental Examples 11 to 12

A charging roll was produced in the same manner as in Experimental Example 10, except that in the preparation of the rubber composition, the type of the ionic electroconductive agent was changed.

Experimental Example 13

A charging roll was produced in the same manner as in Experimental Example 1, except that in the preparation of the rubber composition, the mixing amount of the salt of the cyclic amidine compound was changed and carbon black was further mixed.

Experimental Example 21

A charging roll was produced in the same manner as in Experimental Example 1, except that in the preparation of the rubber composition, the salt of the cyclic amidine compound and the piperidinyloxy radical compound were not mixed.

Experimental Example 22

A charging roll was produced in the same manner as in Experimental Example 21, except that in the preparation of the rubber composition, the amount of the ionic electroconductive agent was increased.

Experimental Examples 23 to 26

A charging roll was produced in the same manner as in Experimental Examples 4 to 7, except that in the preparation of the rubber composition, the piperidinyloxy radical compound was not mixed.

Experimental Example 27

A charging roll was produced in the same manner as in Experimental Example 4, except that in the preparation of the rubber composition, the salt of the cyclic amidine compound was not mixed.

Experimental Example 28

A charging roll was produced in the same manner as in Experimental Example 9, except that in the preparation of the rubber composition, the salt of the cyclic amidine compound was not mixed and further the mixing amount of the phenolic antioxidant was changed.

The following materials were prepared as the materials for the elastic layer forming composition.

- hydrin rubber (ECO): "Epichromer CG102" produced by Osaka Soda
- nitrile rubber (NBR): "Nipol DN3335" produced by Nippon Zeon
- crosslinking agent: "Peroximon F40" produced by NOF
- diazabicycloundecene salt <1>: 3-hydroxy-2-naphthoic acid salt of 1,8-diazabicyclo(5.4.0)undecene-7
- diazabicycloundecene salt <2>: phenolic resin salt of 1,8-diazabicyclo(5.4.0)undecene-7
- diazabicyclononene salt: phenolic resin salt of 1,5-diazabicyclo(4.3.0)nonene-5
- thiophthalimide compound: N-cyclohexylthiophthalimide
- piperidinyloxy radical compound: 4-hydroxy-2,2,6,6-tetramethylpiperidinyloxy radical
- phenolic antioxidant: 2-[1-(2-hydroxy-3,5-di-tert-pentylphenyl)ethyl]-4,6-di-tert-pentylphenyl acrylate
- acid acceptor: "DHT-4A" produced by Kyowa Chemical Industry
- ionic electroconductive agent <1>: "Tetrabutylammonium triflate" produced by Tokyo Chemical Industry Co., Ltd.
- ionic electroconductive agent <2>: the following phosphonium salt (synthetic product)
- ionic electroconductive agent <3>: "1-ethyl-3-methylimidazolium bromide" produced by Shikoku Chemical Industry Co., Ltd.
- carbon black: "SEAST 9" produced by Tokai Carbon Co., Ltd. (specific surface area 142 $m^2/g$)

<Synthesis of Phosphonium Salt>

Tri-n-butyldodecylphosphoniumbromide and bis(trifluoromethanesulfonyl)imidic acid were added to a mixture of methylene chloride and ion-exchanged water (1:1), and the mixture was stirred at room temperature for 4 hours, and then tri-n-butyldodecylphosphonium bis(trifluoromethanesulfonyl)imide was obtained from the organic layer.

The produced charging roll was evaluated for change in resistance and bleeding of the ionic electroconductive agent while energization persisted.

<Method for Evaluating Change in Resistance During Energization>

A load of 700 g was applied to each end of the charging roll on a metal drum of φ30 mm, the metal drum was rotated at 90 rpm, and an energization test was performed with the integrated current amount being 20,000 μA·h. The resistance values before and after the test were obtained, and the change in resistance was calculated in digits. A case where the change in resistance was less than 0.7 digits was rated as "A," a case where the change in resistance was 0.7 digits or more but less than 1.0 digits was rated as "B," and a case where the change in resistance was 1.0 digits or more was rated as "C."

<Method for Evaluating Bleeding>

The charging roll was placed in a humid and hot environment at 40° C. for 30 days, and then whether there was bleeding matter on the surface of the charging roll was observed. A case where no bleeding matter was observed was rated as "A," and a case where bleeding matter was observed was rated as "B."

TABLE 1

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| ECO | 100 | 100 | 100 | 100 | 100 | 100 | 100 | — | 100 | 100 | 100 | 100 | 100 |
| NBR | — | — | — | — | — | — | — | 100 | — | — | — | — | — |
| Crosslinking agent | 3 | 3 | 3 | 3 | 3 | 3 | 3 | 3 | 3 | 3 | 3 | 3 | 3 |
| Diazabicycloundecene salt <1> | 0.1 | 5 | 2 | 2 | — | — | — | 2 | 2 | 2 | 2 | 2 | 2 |
| Diazabicycloundecene salt <2> | — | — | — | — | 2 | — | — | — | — | — | — | — | — |
| Diazabicyclononene salt | — | — | — | — | — | 2 | — | — | — | — | — | — | — |

TABLE 1-continued

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Thiophthalimide compound | — | — | — | — | — | — | 2 | — | — | — | — | — | — |
| Piperidinyloxy radical compound | 0.2 | 0.2 | 0.05 | 3 | 0.2 | 0.2 | 0.2 | 0.2 | — | 0.2 | 0.2 | 0.2 | 0.2 |
| Phenolic antioxidant | — | — | — | — | — | — | — | — | 0.5 | — | — | — | — |
| Acid acceptor | 5 | 5 | 5 | 5 | 5 | 5 | 5 | 5 | 5 | 5 | 5 | 5 | 5 |
| Ionic electroconductive agent <1> ammonium-based | 1 | 1 | 1 | 1 | 1 | 1 | 1 | 1 | 1 | 3 | — | — | 1 |
| Ionic electroconductive agent <2> phosphonium-based | — | — | — | — | — | — | — | — | — | — | 1 | — | — |
| Ionic electroconductive agent <3> imidazolium-based | — | — | — | — | — | — | — | — | — | — | — | 1 | — |
| Carbon black | — | — | — | — | — | — | — | — | — | — | — | — | 20 |
| Change in resistance | A | A | A | A | A | A | A | A | A | A | A | A | A |
| Bleeding | A | A | A | A | A | A | A | A | A | A | A | A | A |

TABLE 2

| | Example | | | | | | | |
|---|---|---|---|---|---|---|---|---|
| | 21 | 22 | 23 | 24 | 25 | 26 | 27 | 28 |
| ECO | 100 | 100 | 100 | 100 | 100 | 100 | 100 | 100 |
| NBR | — | — | — | — | — | — | — | — |
| Crosslinking agent | 3 | 3 | 3 | 3 | 3 | 3 | 3 | 3 |
| Diazabicycloundecene salt <1> | — | — | 2 | — | — | — | — | — |
| Diazabicycloundecene salt <2> | — | — | — | 2 | — | — | — | — |
| Diazabicyclononene salt | — | — | — | — | 2 | — | — | — |
| Thiophthalimide compound | — | — | — | — | — | 2 | — | — |
| Piperidinyloxy radical compound | — | — | — | — | — | — | 3 | — |
| Phenolic antioxidant | — | — | — | — | — | — | — | 3 |
| Acid acceptor | 5 | 5 | 5 | 5 | 5 | 5 | 5 | 5 |
| Ionic electroconductive agent <1> ammonium-based | 1 | 3 | 1 | 1 | 1 | 1 | 1 | 1 |
| Ionic electroconductive agent <2> phosphonium-based | — | — | — | — | — | — | — | — |
| Ionic electroconductive agent <3> imidazolium-based | — | — | — | — | — | — | — | — |
| Carbon black | — | — | — | — | — | — | — | — |
| Change in resistance | C | A | B | B | B | B | C | C |
| Bleeding | A | B | A | A | A | A | A | A |

In Experimental Examples 1 to 13, in preparing the rubber composition, one or two or more selected from hydrin rubber and nitrile rubber, a crosslinking agent, an ionic electroconductive agent, one or two or more selected from piperidinyloxy radical compounds and phenolic antioxidants, and one or two or more selected from salts of cyclic amidine compounds and thiophthalimide compounds were mixed, and the increase in resistance due to polarization of the ionic electroconductive agent was small while energization persisted. Furthermore, no bleeding of the ionic electroconductive agent was observed.

In Experimental Example 21, the rubber composition was prepared without mixing a salt of a cyclic amidine compound, a thiophthalimide compound, a piperidinyloxy radical compound, or a phenolic antioxidant, and the increase in resistance due to polarization of the ionic electroconductive agent was large while energization persisted. In Experimental Example 22, although the increase in resistance during energization was suppressed by increasing the amount of the ionic electroconductive agent, bleeding of the ionic electroconductive agent was observed. In Experimental Examples 23 to 26, the rubber composition was prepared without mixing a piperidinyloxy radical compound and a phenolic antioxidant, and the increase in resistance due to polarization of the ionic electroconductive agent was somewhat large while energization persisted. In Experimental Examples 27 to 28, the rubber composition was prepared without mixing a salt of a cyclic amidine compound and a thiophthalimide compound, and the increase in resistance due to the polarization of the ionic electroconductive agent was large while energization persisted.

Although the embodiments and examples of the disclosure have been described above, the disclosure is not limited to the above-mentioned embodiments and examples, and it is possible to make various modifications without departing from the spirit of the disclosure.

What is claimed is:

1. A charging roll for electrophotographic equipment, comprising a shaft body and an elastic layer formed on an outer peripheral surface of the shaft body, wherein the elastic layer is a crosslinked product of a rubber composition that contains the following (a) to (e):

(a) one or two or more selected from hydrin rubber and nitrile rubber, (b) a crosslinking agent, (c) an ionic electroconductive agent, (d) one or two or more selected from piperidinyloxy radical compounds, and (e) one or two or more selected from salts of cyclic amidine compounds and thiophthalimide compounds.

2. The charging roll for electrophotographic equipment according to claim 1, wherein the (e) is a naphthoic acid salt of a cyclic amidine compound.

3. The charging roll for electrophotographic equipment according to claim 1, wherein the (e) is N-cyclohexylthiophthalimide.

4. The charging roll for electrophotographic equipment according to claim 1, wherein the (c) is an ammonium-based, phosphonium-based, or imidazolium-based ionic electroconductive agent.

5. The charging roll for electrophotographic equipment according to claim 1, wherein the (c) is an ionic electroconductive agent that contains sulfonate anions having fluorine atoms, bis(sulfonyl)imide anions having fluorine atoms, or perchlorate anions.

6. The charging roll for electrophotographic equipment according to claim 1, wherein the rubber composition further contains carbon black that has a specific surface area of 40 $m^2/g$ or more and 300 $m^2/g$ or less.

* * * * *